United States Patent [19]

Graham et al.

[11] Patent Number: 4,884,678

[45] Date of Patent: Dec. 5, 1989

[54] ORBITAL CAP SELECTING AND FEEDING MECHANISM

[76] Inventors: S. Neal Graham, 365 Beechwood Dr., Noblesville, Ind. 46060; Thomas E. Terry, R.R. 2, Box 92, Atlanta, Ind. 46031

[21] Appl. No.: 101,853

[22] Filed: Sep. 28, 1987

[51] Int. Cl.$^4$ .............................................. B65G 29/00
[52] U.S. Cl. ..................................... 198/392; 198/395; 198/398; 198/401
[58] Field of Search ................ 198/391, 392, 395, 396, 198/401, 380, 398; 221/157, 159, 160, 167; 209/587, 644

[56] References Cited

U.S. PATENT DOCUMENTS

| | | | |
|---|---|---|---|
| 2,388,405 | 11/1945 | Glaude | 221/170 |
| 2,888,169 | 5/1956 | Hausman et al. | 221/161 |
| 3,295,661 | 1/1967 | Mitchell, Jr. et al. | 198/391 |
| 3,337,089 | 8/1967 | Bronfmann | 221/160 |
| 3,407,964 | 10/1968 | Wysocki et al. | 221/167 |
| 3,599,829 | 8/1971 | Aidlen et al. | 198/398 X |
| 3,655,028 | 4/1972 | Hodgins | 221/157 X |
| 3,656,604 | 4/1972 | Sterling | 221/157 X |
| 3,696,924 | 10/1972 | Sterling | 209/543 |
| 3,747,738 | 7/1973 | Greck | 221/167 X |
| 4,007,854 | 2/1977 | Ervine | 221/167 |
| 4,093,062 | 6/1978 | Sjogren | 198/380 |
| 4,266,653 | 5/1981 | Mergl | 198/392 |
| 4,608,646 | 8/1986 | Goodrich et al. | 198/395 X |
| 4,709,798 | 12/1987 | Herzog | 198/392 X |

FOREIGN PATENT DOCUMENTS

| | | | |
|---|---|---|---|
| 102314 | 6/1985 | Japan | 209/939 |
| 576386 | 6/1976 | Switzerland | 198/401 |

Primary Examiner—Robert J. Spar
Assistant Examiner—Cheryl L. Gastineau
Attorney, Agent, or Firm—Woodard, Emhardt, Naughton, Moriarty & McNett

[57] ABSTRACT

An orbital cap selection and feeding device is disclosed having a disk rotating within a circular frame so that caps disposed on the disk tend to move by centrifugal force to the perimeter of the disk. The frame includes structure defining a guide chute to retain a procession of caps lying flat within the guide chute and to keep caps at the interior of the rotating disk out of the chute. The guide chute carries the procession of caps about 180 degrees to a discharge chute. About midway along the length of the guide chute is an optical sensor that uses a reflected beam of light to sense the orientation of caps in the procession and generate an electrical signal when an improperly oriented cap is encountered. The signal is received by an ejection airjet downstream of the optical sensor which is actuated in response to the signal to displace the improperly oriented cap from the guide chute and back into the interior of the rotating disk. Properly oriented caps in the procession continue along the guide chute, up a ramp situated flush with the rotating disk and into a stationary discharge chute. A second optical sensor may be added to the discharge chute to sense when the chute is full to continuously activate the ejection airjet.

5 Claims, 5 Drawing Sheets

ORBITAL CAP SELECTING AND FEEDING MECHANISM

BACKGROUND OF THE INVENTION

The present invention relates to a device for automatically sorting elements, such as caps, and feeding the elements to a discharge point in a specific orientation.

Apparatus for sorting articles from a mixed mass of articles on an inclined rotating surface and arranging the articles in single file for discharge, is available in the art. Apparatus of this sort, also referred to as orbital selecting or sorting devices, utilize centrifugal force to transfer the articles on the rotating surface to the perimeter of the surface for selecting or sorting. Some of the prior art devices utilize a plurality of recesses at the perimeter of the rotating surface to assist in the selection of the elements, such as the devices described in patents issued to Wysocki et al., U.S. Pat. No. 3,407,964, and Sterling, U.S. Pat. No. 3,696,924.

Apparatus such as those described in Greck, U.S. Pat. No. 3,747,738, Hausman et al., U.S. Pat. No. 2,888,169, and Ervine, U.S. Pat. No. 4,007,854, utilize orbital sorting techniques to transfer articles in a specific orientation to a discharge chute. In these prior art devices, no actual selection process is occurring, rather the articles are aligned automatically by operation of centrifugal force or gravity in the proper orientation for feeding. Since no selection is made on the basis of the orientation of the elements, the geometry of the elements that can be fed by these latter devices is limited. For instance, in the case of Irvine and Hausman et al., the elements are generally limited to a cylindrical shape.

In the patent to Mergl, U.S. Pat. No. 4,266,653, the elements rotating with the inclined surface are sorted while on the surface so that only elements in a specific orientation are fed through the discharge chute. In Mergl, the selection is performed by operation of gravity on stoppers situated in a perimetrical recess in the rotating surface. In the Mergl device, the selection process occurs at the highest point on the inclined surface, and is brought about by the operation of gravity on the center of gravity of the article to be selected. Thus, if the center of gravity is too high relative to the rotating surface, gravity will pull the piece out of the recess back into the hopper portions of the device. In this respect, the Mergl stoppering machine is limited to a small range of elements having a specific geometry and orientation of the center of gravity.

The apparatus described in Glaude, U.S. Pat. No. 2,388,405, allows selection based on the orientation of open ended hollow caps. In this apparatus, selection is performed by a stationary member that, in essence, pulls properly oriented caps off of the rotating surface and into the discharge chute. In this device, the selection process must occur at the lowest point on the incline device so that the parts or the elements may be fed off of the rotating surface.

None of the above-referenced patents utilizes a remote sensing means to sense the orientation of the part to be selected in order to activate some means to eject an improperly oriented part back into the body of the rotating surface. The devices of Wysocki et al. and Sterling use airjets to discharge improperly oriented caps, but the jets are continuously operating so that improperly oriented caps are automatically blown back into the rotating surface and out of the perimetrical recesses. The apparatus described in Greck utilizes a light source and photosensor, but only to stop the rotation of the inclined plate in the event that the discharge chute is full.

One problem with the orbital sorting devices of the prior art is the feeding speed of the devices has been limited to a maximum of about 1100 parts per minute. Devices that attempt to properly orient the elements to be sorted prior to entry into the discharge chute typically have the lowest feed rate. Apparatus such as in Wysocki and Glaude allow higher feed rates by discarding the improperly oriented parts and feeding only the properly oriented parts. There is a need for an orbital sorting device that produces a higher feed rate of properly oriented parts to the discharge chute.

It is, therefore, an object of the present invention to provide a device that is capable of much higher feed rates. It is a further object to provide an orbital sorting device that is as infallible as possible in feeding only properly oriented elements. Further objects and benefits of the present invention will be apparent from the ensuing description and accompanying figures.

SUMMARY OF THE INVENTION

An orbital cap selecting and feeding device comprises a disk rotatable about its normal axis and having a peripheral portion. Means are provided for containing caps disposed on the disk and the peripheral portion during rotation of the disk. The device further includes sensing means for producing a signal responsive to the orientation of caps rotating with the disk at the peripheral portion. The signal is used to activate means for ejecting an improperly oriented cap from the peripheral portion. Properly oriented caps are not ejected and continue to rotate at the peripheral portion until they enter a stationary discharge chute adjacent the peripheral portion.

DESCRIPTION OF THE PREFERRED EMBODIMENT

Figure 1:
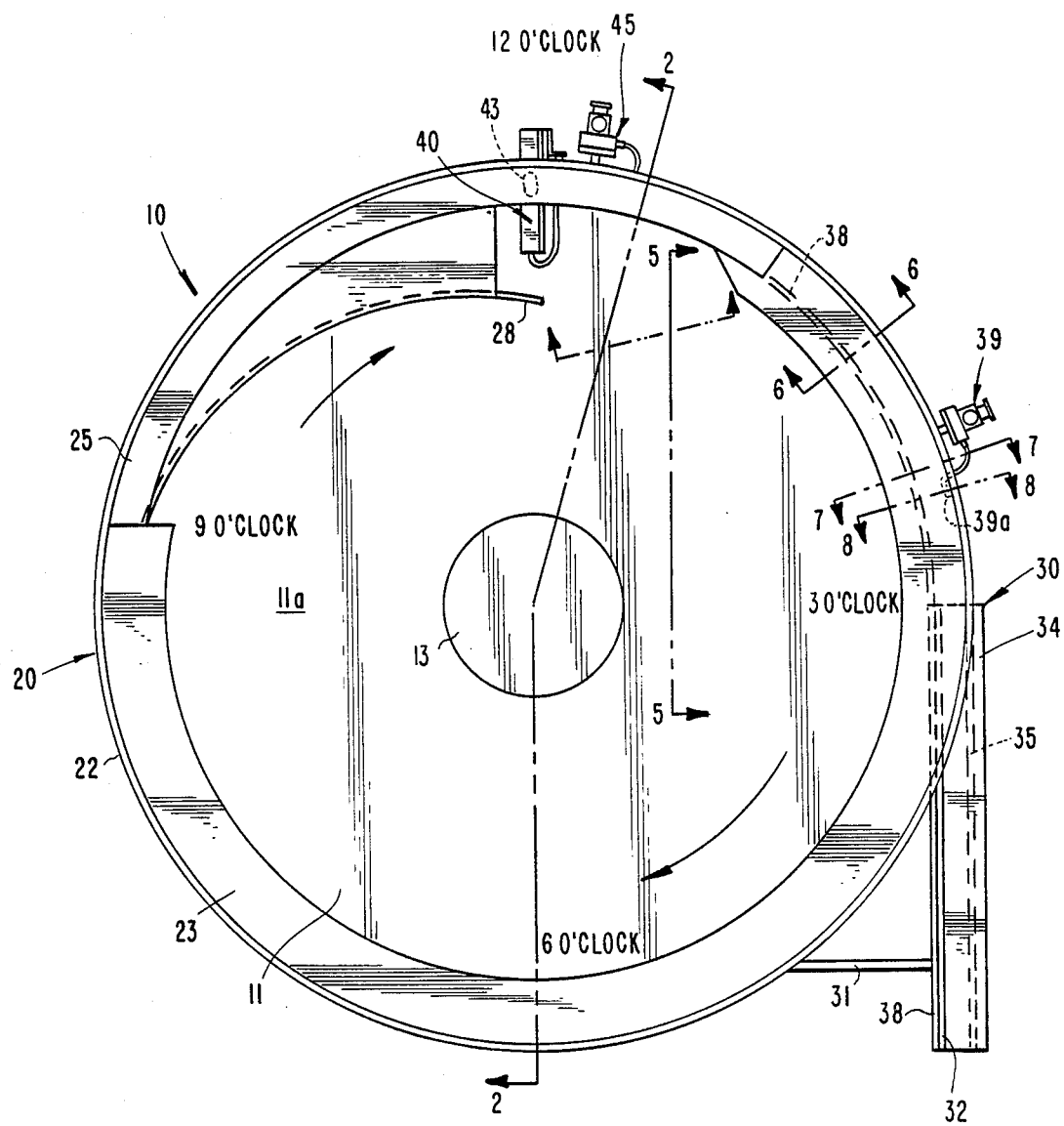
FIG. 1 is a top view of the orbital cap selection device of the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
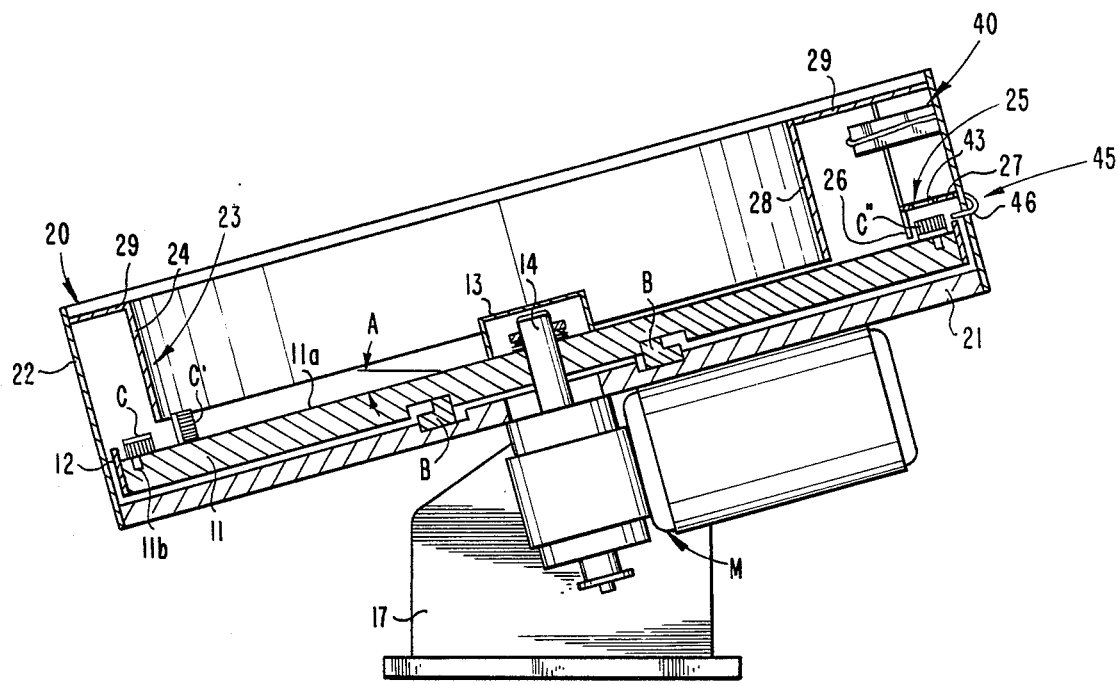
FIG. 2 is a cross-sectional view of the orbital cap selection device taken along line 2—2 in FIG. 1 as viewed in the direction of the arrows.

The orbital cap selection device of the present invention is illustrated more clearly with reference to FIG. 1. The orbital cap selection device 10 is shown as comprising a disk 11 rotating within a circular frame 20. The disk 11 includes a working surface 11a upon which the articles to be sorted are disposed. Disk 11 rotates in the direction of the arrows about a hub 13. A frame 20 includes an outer circumferential wall 22 that is integral with the base 21, as shown in FIG. 2. Bearings B are situated between disk 11 and base 21 so that disk 11 rotates atop the base. A drive shaft 14 extends through base 21 and disk 22 and is bolted to disk 11 underneath hub 13. Motor M, mounted to the underside of base 21, is used to drive shaft 14 to rotate disk 11. The orbital cap selection device 10 is supported by mount 17, which is itself mounted to a level surface, such as a table. The base 21 of the device is pivotally mounted about pivot 18 to mount 17 so that the device can be situated at some angle A relative to the horizontal. The tilting of the base 21 is about an axis extending from the 3 o'clock to the 9 o'clock position in FIG. 1. Locking assembly 19 is used to fix orbital cap selection device 10 at the specific angle A. Locking assembly 19 is easily adjustable and may be, for example, a stud and bolt arrangement, so that the angle A at which the selection device is tilted can be easily varied to optimize the performance of the device. The preferred angle A of operation of the working surface 11a for the present embodiment has been found to be about 15 degrees. The angle A of the working surface 11a insures that the caps C will enter containment chute 23 at the lowest portion (6 o'clock) of the device. The angle A of working surface 11a also aids ejection assembly 45 in ejecting improperly oriented caps from guide chute 25, as will be described in more detail herein. Finally, the 15 degree angle also assists properly oriented caps exiting the device through the discharge chute assembly 30. To further assist the feeding of properly oriented caps, selection device 10 is also tilted at about a five degree angle about an axis from the twelve to the six o'clock positions on device 10.

Referring again to FIGS. 1 and 2, frame 20 includes an outer circumferential wall 22 with collector chute 23 and guide chute 25 affixed thereto. Collector chute 23 is formed by upper wall 29 and containment shell 24, as illustrated in FIG. 2. The lower edge of containment shell 24 is displaced sufficiently above rotating disk 11 so that a cap C lying flat on the disk can pass under containment shell 24, while a cap standing on end, such as cap C', cannot pass under the shell into collector chute 23. As shown in FIG. 2, caps randomly disposed on working surface 11a will fall by gravity against containment shell 24 due to the incline angle A of the rotating disk 11. The action of centrifugal force acting against the caps due to the rotation of disk 11, along with the caps bouncing against each other and the containment shell, tends to cause the caps to fall flat against disk 11, such as cap C. When so oriented, cap C slides underneath the containment shell by action of centrifugal force and is contained on disk 11 by rim 12 fixed to and extending around the perimeter of the disk.

As cap C is carried around device 10 by the rotation of disk 11, it proceeds into guide chute 25. Guide chute 25 is partially defined by guide shell 26, as shown in FIG. 2, which has a lower edge very near working surface 11a of disk 11. The proximity of the lower edge of guide shell 26 to disk 11 ensures that no other caps may enter guide chute 25 without having first passed through collector chute 23, in order to avoid disruption of the procession of caps around guide chute 25. The guide chute also includes guide upper wall 27 fixed between the shell 26 and circumferential wall 22 and forming the top of guide chute 25.

Guide chute 25 extends generally from the 9 o'clock position on orbital cap selection device 10, labeled on FIG. 1, about 180 degrees around the circumference to the 3 o'clock position. At approximately the 3 o'clock position, guide chute 25 directs properly oriented caps into the discharge chute assembly 10.

Figure 4:
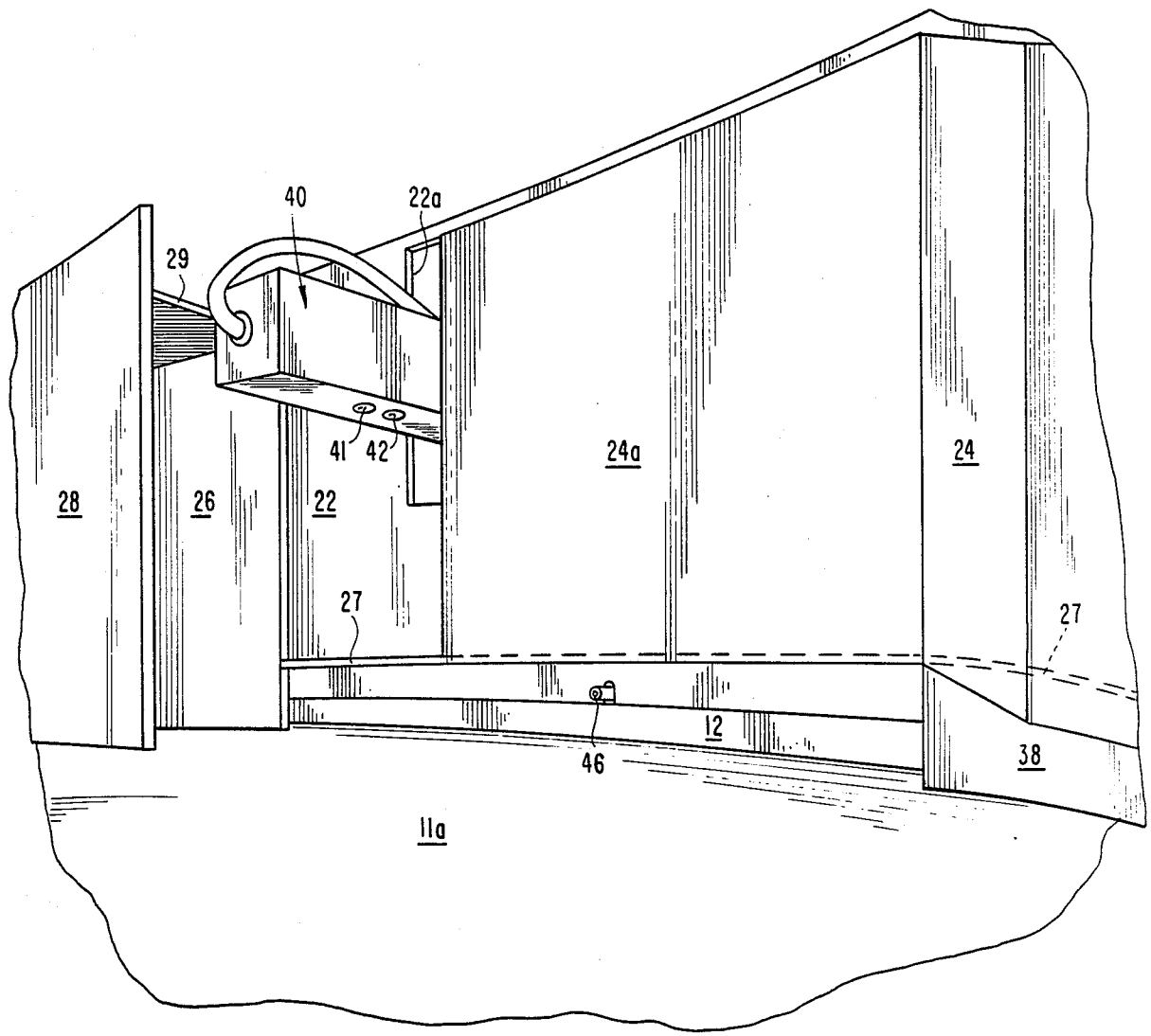
FIG. 4 is an enlarged view along the surface of the inclined disk for the present orbital cap selection device, looking toward the sensor and ejection regions of the device, taken along line 4—4 in FIG. 1 as viewed in the direction of the arrows.

Approximately midway around the path of guide chute 25, or at the 12 o'clock position on orbital cap selection device 10, is a sensor assembly 40. Sensor assembly 40 is mounted to the outer surface of outer circumferential wall 22 and projects into the body of selection device 10 through sensor assembly opening 22a (FIG. 4). In the preferred embodiment, sensor assembly 40 is an optical sensor that transmits a beam of light and receives that beam when it is reflected from a surface. Directly beneath sensor assembly 40 is a sensing opening 43 in upper guide wall 27 that forms the top surface of guide chute 25. A beam of light from sender 41 of sensor assembly 40 (FIG. 4) is directed through sensing opening 43 and reflected back through the opening to receiver 42 of the sensor. In the preferred embodiment, sensor assembly 40 is calibrated to sense the closed side of a cap C" passing under sensing opening 43, as shown in FIG. 2. With this type of depth sensing, the optical sensor is calibrated to "recognize" when the closed side of a cap passes under sensing opening 43. If the cap C" is oriented with the closed side facing disk 11, no cap is sensed by sensor assembly 40. An appropriate such sensing device may be model no. WT 18-N11 available from Sick Optik Electornik of Germany.

The optical sensor of sensor assembly 40 can be calibrated to sense a variety of conditions. For instance, the sensor could be calibrated in a "sender-receiver" mode, wherein an optical sender and an optical receiver are situated circumferentially apart from each other. In this instance, a light beam from the sender is not reflected from a properly oriented cap and received at the receiver portion of the sensor. With an improperly oriented cap, the light beam would be reflected back to the receiver portion of the sensor assembly. Other schemes or methods for sensing the proper orientation of a cap passing beneath sensor assembly 40 are contemplated by the present invention. For instance, an acoustic sensor using sound echoes may be substituted for the optical sensor assembly 40.

Referring again to the specific preferred embodiment, sensor assembly 40 generates a signal when an improperly oriented cap is detected. That signal is received by ejection assembly 45 situated rotationally downstream from sensor assembly 40. Ejection assembly 45 includes an airjet nozzle 46 that is mounted to outer circumferential wall 22 and is directed radially inward across working surface 11a and slightly downward over rim 12 of disk 11, as illustrated in FIG. 2. Ejection assembly may be, for example, #230–260 A plug (Pneumatics brand) and #031SA441C 120/60 valve, U.S.A. Ejection assembly 45 is activated by a signal from sensor assembly 40, and a puff of air is emitted from airjet nozzle 46. Air from the airjet nozzle acts on the improperly oriented cap as it passes by the nozzle to eject the cap from guide chute 25 and push it back toward hub 13. Such action would occur in the case of the upside down Cap C". In the case of a properly oriented cap, such as cap C shown in FIG. 2, no signal is sent by sensor assembly 40 to ejection assembly 45 and, therefore, airjet assembly 46 is not activated, allowing the properly oriented cap C to continue along guide chute 25 toward discharge chute assembly 30.

The location of ejection assembly 45 relative to sensor assembly 40 can be calibrated based on the rotational speed of disk 11, and with reference to the reaction time of the sensor and airjet assemblies. For a given rotational speed, the amount of time required for a cap to pass from a position directly beneath sensor assembly 40 to a position directly aligned with airjet nozzle 46 can be calculated. The time required for sensor assembly 40 to generate a signal for an improperly oriented cap and for ejection assembly 45 to activate nozzle 46 is also a known quantity for a given orbital cap selection device. Ejection assembly 45 can be situated downstream relative to sensor assembly 40 so that the puff of air emanating from airjet nozzle 46 acts only on the improperly oriented cap detected at sensor assembly 40. Thus, as the disk rotational speed increases, airjet nozzle 46 must be located farther downstream from sensor assembly 40 to be activated by the time the improperly oriented cap reaches the ejection assembly 45.

The time period length of the puff of air discharged through airjet nozzle 46 can be calibrated within the limitations of a given eject airjet assembly 45 to insure that only the improperly oriented cap is ejected and not properly oriented caps that may follow immediately after the improperly oriented cap. In one specific embodiment of the present invention, airjet nozzle 46 is located approximately five degrees downstream from sensor assembly 40 for a disk rotational speed of about 45 r.p.m. It has been observed that frequently a cap immediately following an improperly oriented cap will also be ejected from the guide chute by the puff of air from airjet nozzle 46.

Using the sensing and ejection means of the present invention, applicant has been able to achieve cap feed rates of over 3000 parts per minute, which is nearly three times greater than the fastest feed rate previously achieved in prior art devices. Based on these performance statistics, an important benefit of the present invention is apparent.

While the preferred embodiment presently described uses an airjet to eject improperly oriented caps from the guide chute, other electrically activated means are contemplated to perform the same function. Moreover, while the airjet of the present invention has been described as being activated in response to a signal from the sensor assembly, other means for controlling an air stream contacting the procession of caps is also contemplated. For instance, means may be provided to alternately block and unblock the path of air exiting an air nozzle while air is constantly flowing through the nozzle.

Referring again to FIGS. 1 and 2, frame 20 includes deflector rail 28. Deflector rail 28 is affixed to upper wall 29 and projects downward from the upper wall 29 toward the working surface 11a. Deflector rail 28 is situated inboard of guide chute 25 and has a sharper curvature than the guide chute 25. The deflector rail 28 begins at the 9 o'clock position and terminates just beyond the twelve o'clock position of sensor assembly 40. The purpose of deflector rail 28 is to insure that caps rotating with and on the central portion of the working surface 11a of disk 11 do not bounce or are not flung by centrifugal force into the sensing position directly beneath sensor assembly 40 or into the guide chute just beyond ejection assembly 45.

FIG. 4 is a perspective illustration of the sensor and eject positions on orbital cap selection device 10, as viewed along working surface 11a. The optical sender 41 and receiver 42 of sensor assembly 40 are shown directed toward working surface 11a. Guide chute 25 is shown formed by vertical guide shell 26 and horizontal upper guide wall 27. Guide shell 26 terminates just prior to the sensing location so that sensor assembly 40, mounted from outer circumferential wall 22, can project toward the interior of selection device 10. Upper guide wall 27, however, continues around the path of guide chute 25. Containment shell 24, that forms the inside vertical wall for collector chute 23 previously described, originates just beyond the eject region of ejection device 45. Eject region containment shell 24a spans between the sensor location and the beginning of containment shell 24, and is integral with upper guide wall 27.

It is seen from FIG. 4 that the lower edge of ejection region containment shell 24a is the same height from working surface 11a as containment shell 24 so that a cap lying flat on working surface 11a can pass under shell 24a. This is necessary so that improperly oriented caps can be ejected by airjet nozzle 46. This side of guide chute 25 remains open for the length of ejection region containment shell 24a to insure that an improperly oriented cap will be completely ejected from guide chute 25 before reaching the guide side wall 38. The puff of air from eject airjet assembly 45 need only be sufficient to push the improperly oriented cap just slightly radially inwardly of the normal path of guide chute 25 so that the centrifugal force will cause it to bounce off guide side wall 38 and back into the interior of working surface 11a.

Figure 6:
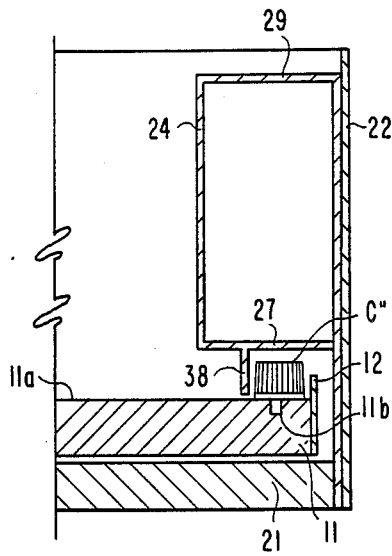
FIG. 6 is an enlarged partial cross-sectional view of the guide chute of the present device, taken along line 6—6 in FIG. 1 as viewed in the direction of the arrows.

At the intersection between containment shell 24 and ejection region containment shell 24a, guide side wall 38 begins to enclose guide chute 25 in preparation for entry to discharge chute assembly 30. The lower edge of guide side wall 38 is situated slightly above working surface 11a, just as guide shell 26 is in the originating portions of guide chute 25. Guide side wall 38 keeps properly oriented caps C' within guide chute 25, and prevents caps disposed inwardly thereof on working surface 11a from improperly entering guide chute 25. As illustrated in the sectional view of FIG. 6, guide side wall 38 is recessed from containment shell 24. That is the guide side wall 38 is spaced radially outwardly of shell 24 and is fixed so as to depend from the upper guide wall 27.

Figure 5:
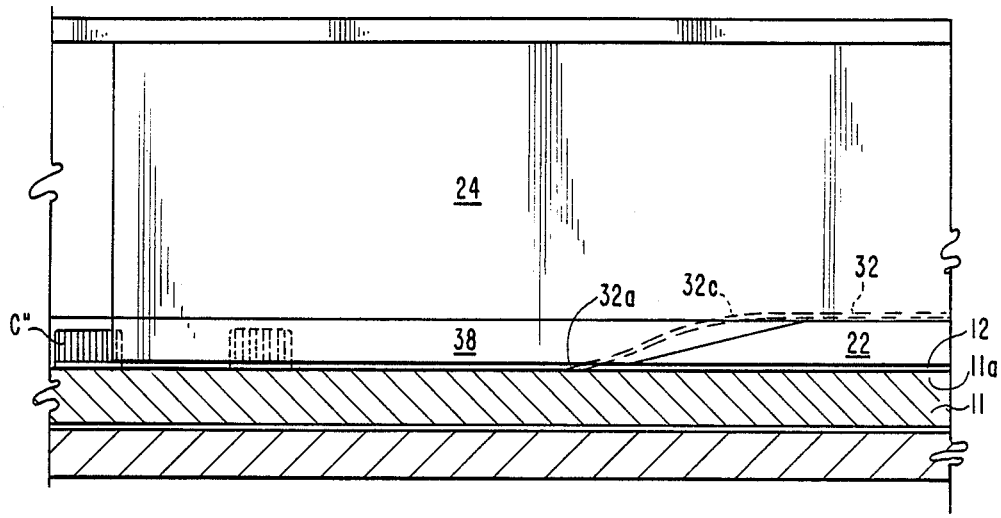
FIG. 5 is an enlarged view along the surface of the inclined disk for the present orbital cap selection device, looking toward the entrance to the discharge chute of the device, taken along line 5—5 in FIG. 1 as viewed in the direction of the arrows.
Figure 3:
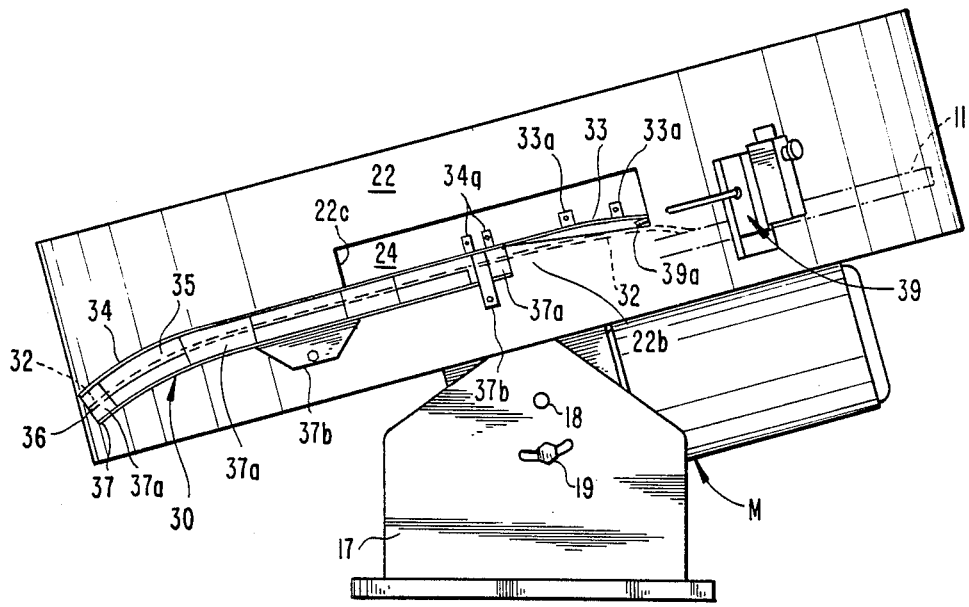
FIG. 3 is a side view of the present orbital cap selection device.
Figure 7:
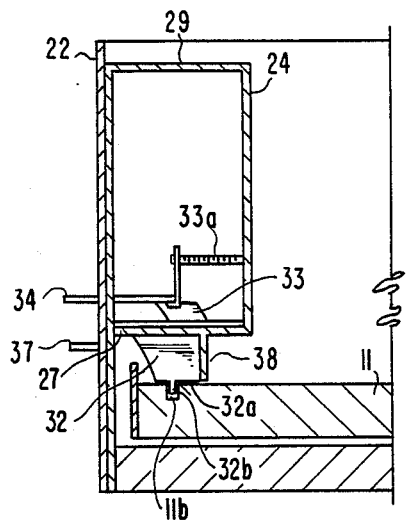
FIG. 7 is an enlarged partial cross-sectional view of the guide chute of the present device at the beginning of the discharge ramp, taken along line 7—7 in FIG. 1 as viewed in the direction of the arrows.
Figure 8:
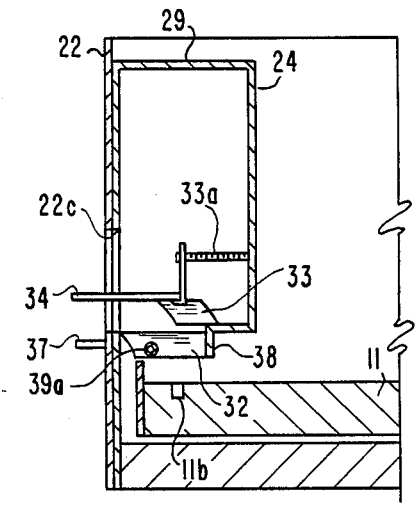
FIG. 8 is an enlarged partial cross-sectional view of the guide chute of the present device at the end of the discharge assist nozzle, taken along line 8—8 in FIG. 1 as viewed in the direction of the arrows.

Referring to FIGS. 3, 7, and 8, the discharge chute assembly is further illustrated. FIG. 7 is a cross sectional view of selection device 10 taken across guide chute 25 at the beginning of ramp 32. Ramp 32 is of fairly thin material so that leading edge 32a is flush with working surface 11a. Tongue 32b projects from the bottom side of ramp 32 and rides within ramp positioning groove 11b around the perimeter of disk 11. Guide side wall 38 forms an interior wall adjacent to the ramp 32. Ramp 32 is a flattened S-shape (FIG. 5) so that the ramp can clear rim 12 of the rotating disk 11, while providing a smooth transition for the properly oriented cap C" from the rotating disk to the discharge chute assembly 30.

In order to assist entry of the properly aligned cap C" onto discharge ramp 32, a discharge assist assembly 39 is provided. Discharge assist assembly 39 includes an airjet nozzle 39a that is directed toward ramp 32 so that as the cap C" is flung onto ramp 32 by the rotation of disk 11, the cap gets an extra assist from a continuous puff of air from airjet nozzle 39a. The puff of air from airjet nozzle 39a helps the cap C" to negotiate the S-shape of ramp 32 until it reaches the apex 32c of the ramp at which point gravity will help pull the cap through the discharge chute assembly 30 due to the incline of selection device 10.

The cross sectional view in FIG. 8 is taken just at the end of discharge assist airjet nozzle 39a. Ramp cover 33 is integral with guide side wall 38 and follows the contour of ramp 32 to provide a closed track for the properly oriented cap C". Ramp cover 33 is supported by mounting brackets 33a that are affixed to the outer surface of containment wall 24. Ramp cover 33 continues generally parallel to ramp 32 until the ramp has completed its S-shape and has cleared rim 12 of disk 11. At that point, ramp 32 slopes downwardly parallel to the inclined angle of orbital cap selection device 10, as shown in FIG. 3. Ramp cover 13 mates with discharge chute cover 34 generally at the apex 32a of ramp 32, which cover continues to the end of discharge chute assembly 30. guide side wall 38 also continues along the length of discharge chute assembly 30 to form one side of the discharge chute. Side wall 35 forms the opposite side wall. Thus, the discharge chute is formed by ramp 32, guide side wall 38, side wall 35 and discharge chute cover 34. Discharge chute assembly 30 terminates in a discharge opening 36 that can be mated to a chute or track of a separate cap manipulation device, such as a machine that affixes the caps to a bottle or container (see FIG. 9).

The entire discharge chute assembly 30 extends through a rectangular opening 22c in outer circumferential wall 22 so that the discharge is outside of selection device 10. Mounting of the discharge chute to device 10 is achieved using a lower plate 37 extending along the length of and parallel to ramp 32. Lower plate 37 is fixed to side wall 35 and discharge chute cover 34 by plurality of flanges 37a. Lower plate 37 is mounted to the outer surface of outer circumferential wall 22 to support discharge chute assembly 30. In addition, discharge chute cover 34 is mounted to the outer surface of containment wall 24 by brackets 34a. Mounting brackets 34a and 37a are configured so that the entire discharge chute assembly 30 can be removed and replaced for mating with a variety of cap manipulation devices. In this instance, ramp 32 is divided adjacent the apex 32a of the ramp so that the portion of ramp 32 forming the bottom of the discharge chute can be removed with the remainder of the assembly.

Figure 9:
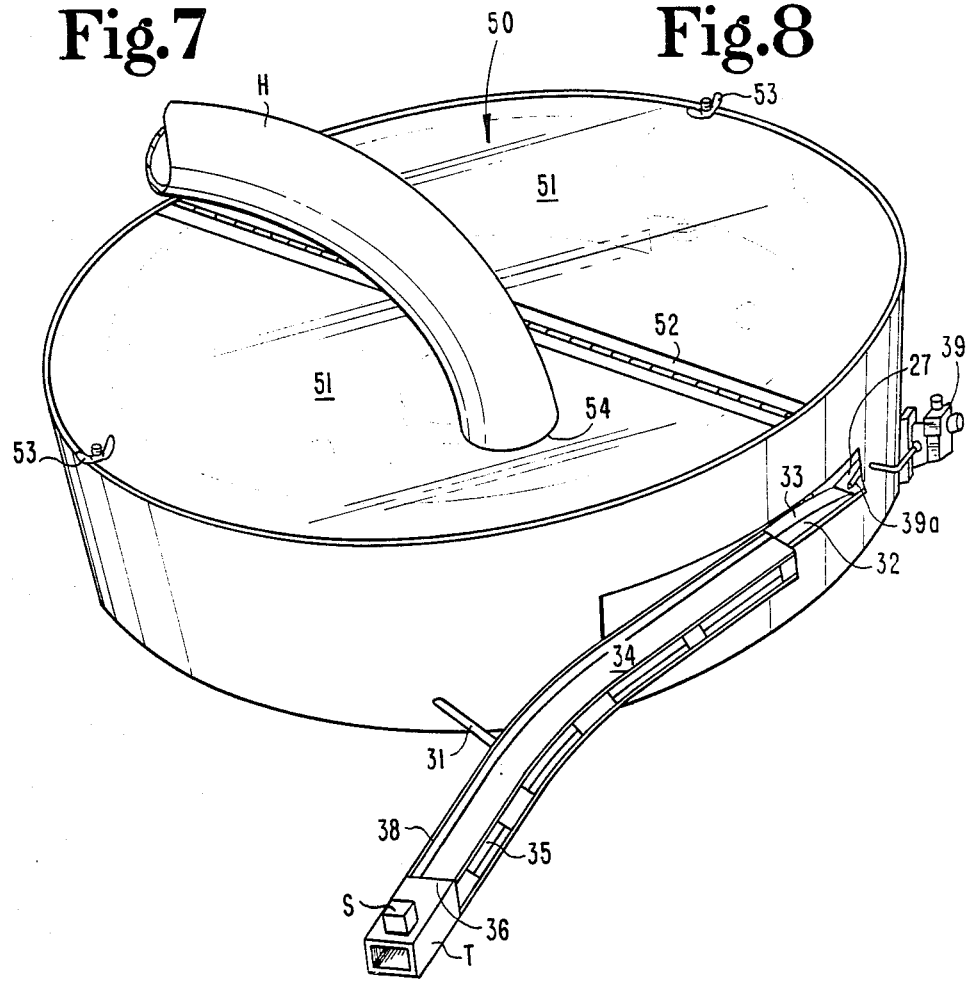
FIG. 9 is a perspective view of the orbital cap selection device of the present invention shown with the cover assembly mounted thereon and with the mating track and fill sensor of a cap manipulation device shown in phantom.

Referring to FIG. 9, orbital cap selection device 10 is shown with a cover assembly 50 affixed over the open portion of the device. Cover assembly 50 comprises a pair of clear Lexan cover plate halves 51 joined at hinge 52. The two halves are attached to frame 20 of selection device 10 by a pair of fasteners 53. One of the cover plate halves 51 includes a feed opening 54 into which a hopper supply tube H is installed. Hopper supply tube H feeds caps from a hopper into orbital cap selection device 10 through feed opening 54 and onto working surface 11a of the rotating disk 11. Feed opening 54 is oriented at about the four o'clock position on selection device 10, that is, near the lowest point of the inclined device. The location of feed opening 54 allows caps entering device 10 to join the mass of caps already on working surface 11a without the risk of some of the caps bouncing into the sensor and ejection regions near the twelve o'clock position on device 10.

In one use of orbital cap selection device 10, discharge chute assembly 30 mates with an accumulator or gravity track T at the entrance chute to a cap manipulation machine, such as a bottle capper, as shown in FIG. 9. Track T can include a sensor S for sensing when the track is full of properly oriented caps. Sensor S produces a signal that is received by ejection assembly 45 to activate airjet nozzle 46. Thus, when a full condition is sensed by sensor S, airjet nozzle 46 is continually activated so that all caps passing by ejection assembly 45 along guide chute 25 are automatically ejected back onto disk working surface 11a. No caps, whether or not properly oriented, continue along guide chute 25 into discharge chute assembly 30 until the full signal from sensor S is terminated.

Orbital cap selection device 10 is easily adapted for use with open-ended hollow articles, such as a threaded bottle cap. However, one advantage of the present invention is that a variety of articles and exterior geometries can be selected and fed. The versatility of remote sensing, such as by optical sensor 40, allows selection of the articles to be based on any number of variations in exterior geometry, provided that the article to be sorted appears different to the sensor between a proper and an improper orientation. The use of optical sensing and electrically actuated ejection to perform selection on a moving surface allows for faster article selection than in the prior art. The selection device of the present invention has achieved feed rates for open-ended hollow caps of over 3000 parts per minute. In the use of the invention to date, the efficiency of the selection has been 100 percent, that is no improperly aligned caps have advanced into the discharge chute having escaped sensing and/or ejection.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for feeding caps, comprising:
   a disk freely rotatable about its normal axis and having a peripheral portion;

discharge means, including a stationary discharge chute intersecting said peripheral portion, for feeding caps rotating with said peripheral portion;

chute sensing means for producing a first signal when said discharge means is filled with caps to a predetermined level below the level at which caps in said discharge chute will contact caps rotating with said disk;

means for ejecting caps from said peripheral portion in response to the signal from said chute sensing means;

orientation sensing means for producing a second signal responsive to the orientation of caps rotating with said disk at said peripheral portion; and wherein said means for ejecting is an air jet alternatively responsive to either of said first signal and said second signal to eject caps from said peripheral portion.

2. An apparatus for sorting hollow open-ended caps, comprising:

an inclined disk rotatable about its normal axis and having a peripheral portion onto which open-ended caps disposed on said disk move by operation of centrifugal force during rotation of said disk;

means for detecting the orientation of the open-ended caps on said peripheral portion near the highest point of said inclined disk during rotation of said disk, and for sorting based on the orientation of the open end of the caps; and a discharge chute tangentially intersecting said peripheral portion approximately 90° downstream of said sorting means in the direction of rotation of said disk for receiving sorted open-ended caps.

3. An apparatus for feeding caps, comprising:

disk rotatable about its normal axis and having a peripheral portion;

means for containing caps disposed on said disk during rotation of said disk;

sensing means for producing a signal responsive to the orientation of caps rotating with said disk at said peripheral portion;

means, downstream of said sensing means in the direction of rotation of said disk at a predetermined distance, for ejecting an improperly oriented cap from said peripheral portion in response to the signal from said sensing means; and a stationary discharge chute intersecting said peripheral portion for feeding properly oriented caps after they have passed said means by ejecting, wherein said predetermined distance is proportional to the speed of rotation of said disk and to the time required for said means for ejecting to respond to said signal;

wherein said disk includes a rotatable working surface generally coplanar with said peripheral portion, wherein said caps are disposed on said working surface and further wherein said improperly oriented caps are ejected onto said working surface; and said apparatus includes means for deflecting caps rotating with said working surface away from said sensing means and said means for ejecting to prevent interference of caps rotating with said working surface with caps rotating with said disk at said peripheral portion.

4. The apparatus of claim 3, wherein:

said means for containing caps includes a rim around the outer edge of said disk; and wherein said apparatus further comprises a stationary wall defining an annular channel over a part of said peripheral portion between said rim and said wall, said wall having a lower edge, said lower edge being displaced above said disk sufficient to allow only caps oriented with their closed ends or open ends against the disk to enter said annular channel.

5. An apparatus for feeding caps, comprising:

a disk rotatable about its normal axis and having a peripheral portion;

means for containing caps disposed on said disk during rotation of said disk;

sensing means for producing a signal responsive to the orientation of caps rotating with said disk at said peripheral portion;

means, downstream of said sensing means in the direction of rotation of said disk at a predetermined distance, for ejecting an improperly oriented cap from said peripheral portion in response to the signal from said sensing means; and a stationary discharge chute intersecting said peripheral portion for feeding properly oriented caps after they have passed said means for ejecting, wherein said predetermined distance is proportional to the speed of rotation of said disk and to the time required for said means for ejecting to respond to said signal; wherein said disk is inclined such that said sensing means is situated near the highest point of said inclined disk; and said discharge chute tangentially intersects said peripheral portion approximately 90° downstream of said sensing means.

* * * * *

UNITED STATES PATENT AND TRADEMARK OFFICE
CERTIFICATE OF CORRECTION

PATENT NO. : 4,884,678

DATED : December 5, 1989

INVENTOR(S) : S. Neal Graham and Thomas E. Terry

It is certified that error appears in the above-identified patent and that said Letters Patent is hereby corrected as shown below:

```
In column 4, line 30, please change 10 to --30--
In column 7, line 40, please change 13 to --33--.
In column 7, line 43, please change guide to
--Guide--.
```

Signed and Sealed this

Fifteenth Day of January, 1991

Attest:

HARRY F. MANBECK, JR.

*Attesting Officer*      *Commissioner of Patents and Trademarks*